United States Patent
Li

(12) 
(10) Patent No.: US 6,301,137 B1
(45) Date of Patent: Oct. 9, 2001

(54) THREE-PHASE CURRENT SENSOR AND ESTIMATOR

(76) Inventor: Hui Li, 6216 Windsor St., Vancouver, British Columbia (CA), V5W 3J3

(*) Notice: Subject to any disclaimer, the term of this patent is extended or adjusted under 35 U.S.C. 154(b) by 0 days.

(21) Appl. No.: 09/706,135

(22) Filed: Nov. 3, 2000

(30) Foreign Application Priority Data

Nov. 5, 1999 (CA) .................................................. 2288581

(51) Int. Cl.[7] .............................. H02M 3/24; H02M 5/34
(52) U.S. Cl. .............................. 363/98; 363/132; 318/801
(58) Field of Search ........................... 363/40, 41, 56.01, 363/56.02, 97, 98, 131, 132; 318/254, 439, 800, 801, 802, 803

(56) References Cited

U.S. PATENT DOCUMENTS

| | | | |
|---|---|---|---|
| 5,119,007 | * 6/1992 | Tunehiro et al. | ..................... 318/801 |
| 5,323,093 | 6/1994 | Kikuchi . | |
| 5,469,033 | 11/1995 | Huang . | |
| 5,495,154 | 2/1996 | Carobolante . | |
| 5,589,751 | 12/1996 | Lim . | |
| 5,615,102 | * 3/1997 | Daijo | ..................... 363/132 |
| 5,627,447 | * 5/1997 | Unsworth et al. | ..................... 318/801 |
| 5,670,859 | * 9/1997 | North et al. | ..................... 318/801 |
| 5,734,250 | * 3/1998 | Lindmark | ..................... 318/801 |
| 5,825,641 | 10/1998 | Mangtani . | |
| 6,049,474 | * 4/2000 | Platnic | ..................... 363/98 |

* cited by examiner

*Primary Examiner*—Matthew Nguyen
(74) *Attorney, Agent, or Firm*—Clifford W. Vermette

(57) ABSTRACT

In a three-phase DC-to-AC inverter including, for driving each leg of the load, a controlled power driver such a pulse-width modulated field-effect transistor (FET) or insulated gate bipolar transistor (IGBT) pair, an estimator for estimating the current in each leg of the load. A low-resistance leg resistor is connected in series in the lower leg of each transistor pair. The voltages across the leg resistors are applied to two differential amplifiers to generate two discrete voltage difference values that are transmitted to an estimator. The estimator solves specified differential equations using suitably interconnected combiners, integrators, amplifiers and multipliers, or discrete digital equivalent or programmed computer equivalent, to derive a value for the estimated current in each leg of the load.

27 Claims, 2 Drawing Sheets

THREE-PHASE CURRENT SENSOR AND ESTIMATOR

This application relates to current sensors and estimators for use with inverters such as pulse-width modulated field-effect transistors for driving a three-phase load, and in particular to an estimator for estimating the current flowing in each of the three legs of a three-phase load.

BACKGROUND OF THE INVENTION

It is conventional to use Hall-effect devices to measure the current in each of the legs of a three-phase load supplied by a pulse-width modulated inverter. Such inverters typically use three pairs of field-effect transistors (FETs) or equivalent to supply the three-phase load (which may be, for example, a three-phase AC motor). Hall-effect devices are large and expensive. It is an object of this invention to replace such devices with a small and economical solid-state circuit that makes use of sensing resistors in the return legs of the inverter circuit in combination with an estimator for receiving certain signals representing selected parameters and computing an estimated current value for each leg.

It is known to introduce a resistor into one or more of the return legs of the FETs of an inverter. See, for example, U.S. Pat. No. 5,825,641 issued to Mangtani on Oct. 20, 1998. However, Mangtani does not provide any provision to utilize the voltages developed across the sensing resistors to generate an estimate of the respective currents flowing in the legs of the load.

Voltages across sensing resistors have also been used to control brushless motors; see for example U.S. Pat. No. 5,469,033 issued to Huang on Nov. 21, 1995. However, Huang makes no provision for producing a signal representative of the current flowing in each leg of the load.

SUMMARY OF THE INVENTION

For measuring leg current in each leg of a three-phase load powered by an inverter including an FET arrangement of the type described above, or equivalent, the present invention replaces the conventional Hall-effect device with simple sensing resistors, one in each return leg A, B, and C of each field-effect transistor (FET) pair of the inverter. By comparing and processing the voltages produced across the sensing resistors, estimated values of the current in each leg of the load are obtained. The sensing resistors should be of low resistance so as not to generate unacceptable power losses.

If the voltages produced by these leg resistors in the three return legs of the FETs are expressed as $V_a$, $V_b$ and $V_c$ respectively, and if the voltages $V_a$ and $V_c$ are applied to the input terminals of a first differential amplifier, and if the voltages $V_b$ and $V_c$ are applied to the input terminals of a second differential amplifier, the output voltages of these differential amplifiers will be respectively of the form $$D_{vac}=K(V_a-V_c)/(TS+1)$$

and $$D_{vbc}=K(V_b-V_c)/(TS+1)$$

Where $D_{vac}$ is the differential voltage output of the first differential amplifier, whose input terminals are connected across legs A and C of the circuit (in each case between the associated sensing resistor of the respective leg and the FET connected to the sensing resistor);

$D_{vbc}$ is the differential voltage output of the second differential amplifier, whose input terminals are connected across legs B and C of the circuit (in each case between the associated sensing resistor of the respective leg and the FET connected to the sensing resistor);

K is the gain of the differential amplifier; and

1/(TS+1) is a dimensionless value representing the filter bandwidth in the differential amplifier. The value T is an intrinsic value representing the resistance-capacitance time constant of the differential amplifier, and S is the Laplace operator.

The continuous output analog differential voltage signals produced by the two differential amplifiers may conveniently be converted to digital signals that are processed in a microprocessor to produce estimated values of the current in each leg of the load. These estimated current values may in turn be displayed for the benefit of the operator of the three-phase load being driven by the inverter, or may be used to drive a suitable feedback loop or circuit, or otherwise. The particular use to which the estimated load leg current values are put is not per se part of the present invention.

More specifically, the three-phase DC-to-AC inverter for which the present invention is suitable conventionally includes three pairs of FETs that are pulse-width modulated. Insulated gate bipolar transistors (IGBTs) may be substituted for the FETs; this specification should be read with this possibility in mind. Alternative equivalent inverter circuits may be devised. For the purpose of this specification, the AC power drivers such as FETs in such circuits are referred to as controlled power drivers, and in the case of FETs, the control is supplied by means of an individual pulse-width modulated gate control signal applied to each FET.

According to the invention, the current is estimated in each leg of the load by providing first, second and third resistors respectively in the return legs of associated pairs of FETs to derive a load current-sensitive voltage across each resistor. These voltages are applied as follows to a pair of differential amplifiers: The voltage appearing at the junction of the return leg A of the first pair of FETs and the associated first resistor is applied to a first input terminal of the first differential amplifier, and the voltage appearing at the junction of the return leg C of the third pair of FETs and the associated third resistor is applied to a second input terminal of the first differential amplifier. The voltage appearing at the junction of the return leg B of the second pair of FETs and the associated second resistor is applied to a first input terminal of the second differential amplifier, and the voltage appearing at the junction of the return leg C of the third pair of FETs and the associated third resistor is applied to a second input terminal of the second differential amplifier. (Note that in this specification, the designations "first", "second", "third", and legs "A", "B", and "C", and related identifying symbols, are arbitrary.) The two differential amplifiers receiving these input voltages generate the output differential voltages $D_{vac}$ and $D_{vbc}$ respectively.

A leg current estimator, preferably including a suitable signal processing circuit within a microcontroller, is provided to process the output signals $D_{vac}$ and $D_{vbc}$ obtained from the $$\frac{d I_{aE}}{dt} = z \left[ D_{Vac} - \frac{I_{aE}}{M}(M-\alpha) + \frac{I_{cE}}{M}(M-\gamma) \right];$$

differential amplifiers to solve the equations:

$$\frac{dI_{bE}}{dt} = z\left[D_{Vbc} - D_{Vac} + \frac{I_{aE}}{M}(M-\alpha) - \frac{I_{bE}}{M}(M-\beta)\right];$$

and $$\frac{dI_{cE}}{dt} = z\left[-D_{Vbc} + \frac{I_{bE}}{M}(M-\beta) - \frac{I_{cE}}{M}(M-\gamma)\right];$$

where $I_{aE}$ is the estimated current in leg A;
$I_{bE}$ is the estimated current in leg B;
$I_{cE}$ is the estimated current in leg C;
t is time;
z is the dimensionless bandwidth of the processing circuitry (which may be set by the operator and may arbitrarily take the value of 10,000 in the absence of any good reason for choosing a different value; normally the value of z is selected to ensure that analysis occurs within the range of linear performance of the load; for higher load frequencies, the value of z should be higher, for lower load frequencies, the value of z may be lower); M is the half-period of the pulse width modulating signal (i.e., M may be expressed as ½f, where f is the pulse-width modulating signal carrier frequency); and the values $\alpha$, $\beta$ and $\gamma$ are derived as follows:

$\alpha = V_L \sin(\omega t - \phi)$ $\beta = V_L \sin(\omega t - \phi - 2\pi/3)$ $\gamma = V_L \sin(\omega t - \phi - 4\pi/3)$ where $V_L$ is the amplitude, $\omega$ is the load voltage frequency, and $\phi$ is the phase angle of the load voltage. These three values $\alpha$, $\beta$ and $\gamma$ are set by the operator in the microcontroller depending upon the three-phase power application required. Note that the values $\alpha$, $\beta$ and $\gamma$ are proportional to the instantaneous load leg voltages in legs A, B, C respectively.

Solving the differential equations listed above using the microprocessor or other suitable estimator enables the microprocessor to calculate values representative of load leg currents. As discussed, these values may be displayed, used to control or set feedback values for AC power driver circuit control, or otherwise used by the operator to advantage. However, the use of such values representative of the estimated current in each leg of the load is not a part of the present invention.

An embodiment of the invention including an estimator using discrete devices will be described in this specification. Depending upon the means used to derive and process data representing the voltage differences $D_{vac}$ and $D_{vbc}$, the discrete devices may be analog or digital or some suitable combination of the two. Further, to the extent that discrete digital devices may be employed, a general-purpose or special-purpose digital computer or microprocessor could be used in substitution for discrete devices, with the requisite operations optionally performed by suitable programming.

DETAILED DESCRIPTION OF THE PREFERRED EMBODIMENT

Figure 1:
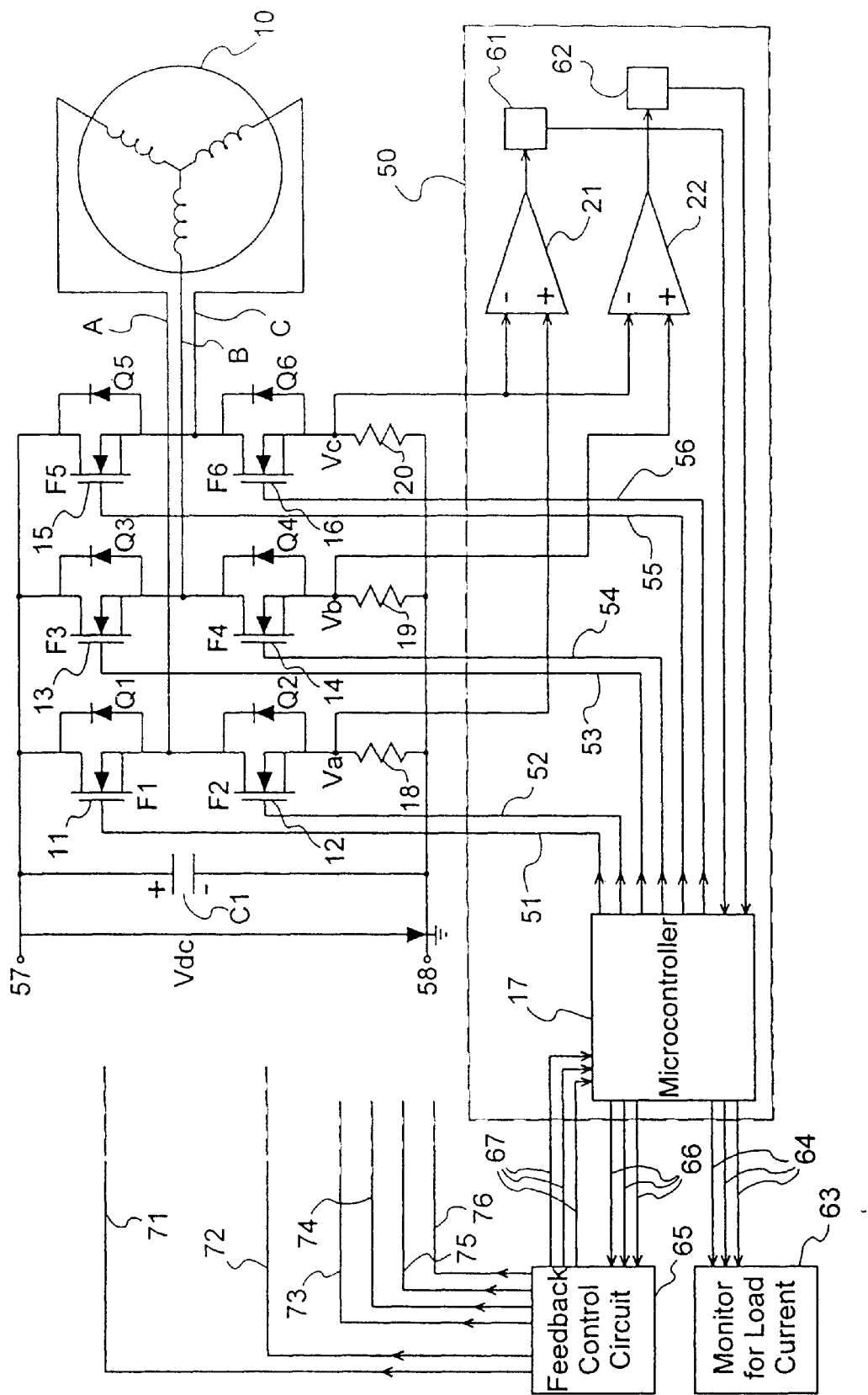
FIG. 1 is a circuit diagram of an inverter coupled with a block diagram of load leg current sensing and computation apparatus, incorporating an embodiment of the present invention.

Considering first FIG. 1, within box 50 are components and signals presented in flowchart format for simplicity of description; outside the box 50 the circuit diagram is conventional, all connections required for circuit completion being illustrated in that part of the diagram lying outside box 50.

A three-phase load, such as exemplary three-phase AC motor 10, is supplied from a pulse-width modulated inverter powered by a DC source providing input voltage $V_{dc}$ via DC terminals 57, 58 across a smoothing capacitor C1. The inverter comprises six FETs in three pairs: F1, F2 (for leg A of the load), F3, F4 (for leg B of the load), and F5, F6 (for leg C of the load). The emitters and collectors of each FET pair are connected in series across the DC supply, and each leg of the load is connected to an associated junction point between the associated transistor pair. The emitters and collectors of these FETs are respectively connected in parallel with diodes Q1, Q2, Q3, Q4, Q5 and Q6 so as to maintain continuity of output current. Note that such diodes are standard for use with FETs and are normally physically incorporated into the FETs themselves. The FETs are respectively gated by gates 11, 12, 13, 14, 15 and 16 to which the appropriate pulse-width modulated control signals 51, 52, 53, 54, 55, 56 respectively, are applied in dependence upon the type of load and the calculated leg current, the latter being estimated as discussed generally above and as discussed further below.

A microcontroller 17 including a microprocessor is provided that receives as inputs the converted differential voltage signal outputs of differential amplifiers 21 and 22 whose analog outputs are respectively converted by analog/digital converters 61 and 62 to digital signals suitable for processing by the microcontroller 17. Although illustrated as separate components in FIG. 1, analog/digital converters 61, 62 may be incorporated into the microcontroller 17, and may be omitted entirely if followed by discrete analog devices (the latter being an alternate embodiment of the estimator of FIG. 2, to be described below). The microcontroller 17 performs suitable computations on these digitised differential voltage signals in order to estimate the leg current in each leg. On a continual basis, the microcontroller 17 provides suitable output pulse-width modulated drive signals 51, 52, 53, 54, 55, 56 to the gates 11, 12, 13, 14, 15 and 16 respectively of the FETs F1, F2, F3, F4, F5, F6 respectively, so that the FETs provide appropriate current to the respective leg of the load.

Figure 3:
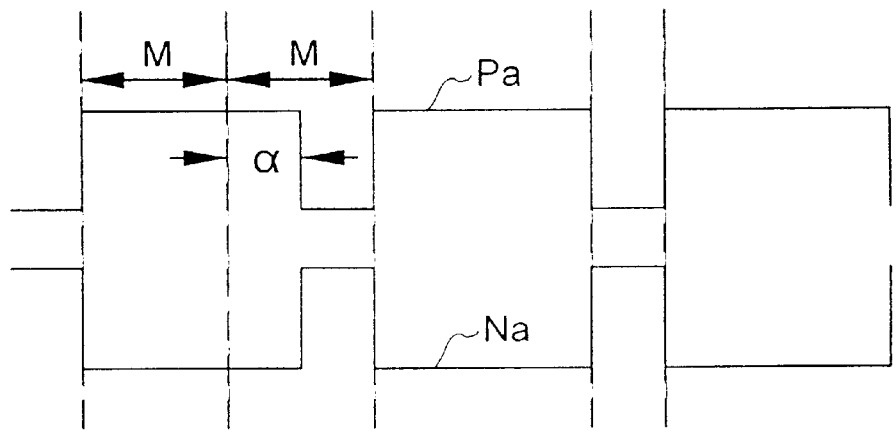
FIG. 3 is a graphic representation of the waveform used to drive one exemplary pair of the FETs of FIG. 1.

Typical of the output gate drive signals produced by the microprocessor 17 are the waveform pair Pa, Na for leg A as shown in FIG. 3. These two waveforms represent the control pulse-width modulated switching signals 51, 52 applied to gates 11 and 12 of FETs F1, F2 respectively, the wave form designated Pa being representative of the drive signal 51 applied to gate 11 and illustrating pulse width components M and $\alpha$, and the wave form Na being representative of the drive signal 52 applied to gate 12. Note that wave form Na is the mirror image of the wave form Pa; in other words, the two wave forms at any point in time are of equal value but opposite polarity. A similar description applies to production of pulse-width modulated switching signals 53, 54 for leg B (in response to pulse width components M and $\beta$), and pulse-width modulated switching signals 55, 56 for leg C (in response to pulse width components M and γ). Such drive signals and the circuits for producing them are well known and will not be described further in this specification.

In the lower legs of the inverter circuit are load current sensing resistors 18, 19 and 20 for each of the legs A, B and C respectively. These resistors 18, 19 and 20 should have sufficient resistance that reliable differential voltages are applied to differential amplifiers 21 and 22 within a preferred input voltage range for these differential amplifiers, but as the resistors dissipate power otherwise available for the load 10, the resistance of each of the resistors should be as low as practicable. Depending upon the particular application, representative resistance values for the resistors 18, 19 and 20 can be, for example, in the 0.05 Ω range.

The voltages developed across the resistors 18, 19 and 20, designated $V_a$, $V_b$ and $V_c$ respectively, constitute input voltages to the differential amplifiers 21 and 22. Voltages $V_a$ and $V_c$ are respectively applied to the two input terminals of differential amplifier 21, and voltages $V_b$ and $V_c$ are applied to the input terminals of differential amplifier 22.

The differential amplifiers 21 and 22 have a gain K and a frequency response represented by the dimensionless value 1/(TS+1), T being the inherent RC time constant of the differential amplifier, and S the Laplace operator, as previously mentioned, so that the output $D_{vac}$ of differential amplifier 21 is $$K(V_a-V_c)/(TS+1)$$

and the output $D_{vbc}$ of differential amplifier 22 is $$K(V_b-V_c)/(TS+1)$$

The respective converted or unconverted outputs of differential amplifiers 21 and 22 are applied to a suitable estimator. The estimator may be a general-purpose or special-purpose digital computer or microprocessor, or may be composed of discrete components, either analog or digital in character. As the signals representing voltages obtainable across the resistors 18, 19 and 20 are real-time signals, and consequently the output signals obtainable from the differential amplifiers 21 and 22 may conveniently be analog in character, an analog estimator circuit could directly follow the differential amplifiers 21 and 22 without requiring conversion of their outputs to digital signals. Alternatively, the estimator circuit could be a digital circuit that either could be built from discrete digital components, or could be an integral part of a computer or processor, in which cases analog-to-digital converters 61 and 62 would be provided to convert the analog output signals of the differential amplifiers to digital format. As a further alternative, the differential amplifiers 21 and 22 could be replaced by digital devices after conversion of the voltage signals obtained across resistors 18, 19 and 20 to digital format. Various discrete digital devices could, of course, be replaced by functional operations of the computer or microprocessor, if used, operating in response to a suitable computer program.

Figure 2:
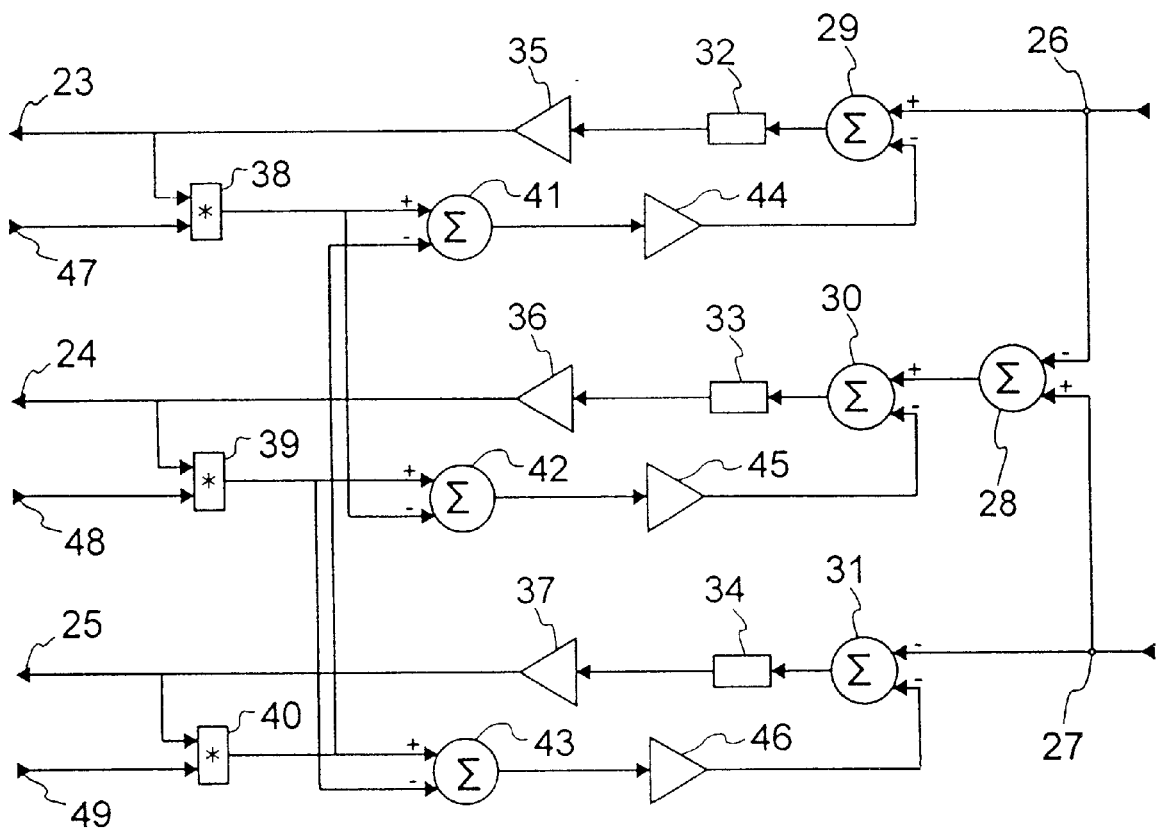
FIG. 2 is a diagrammatic signal-processing flowchart of a suitable signal processor.

For convenience and as an aid to understanding, a discrete-device alternative is illustrated in FIG. 2. The discrete devices illustrated may be analog or digital in character; if analog, the analog-to-digital converters 61 and 62 would be omitted. However, the entire signal processor of FIG. 2 could instead form a portion of the microcontroller 17 or of a separate microprocessor, or the operations required of the estimator arrangement of FIG. 2 could be performed by a general-purpose digital computer. Note that operations performed on analog signals will tend to produce smooth signal outputs, whereas if digital operations are performed, a given signal waveform is approximated by a step-wise series of values. This is inherent in digital operations, and is of no adverse consequence as long as the digital signal sampling rate is high enough to meet the practicalities of the requirement for which estimated leg load current is being estimated.

The signal processor of FIG. 2 produces three outputs at terminals 23, 24 and 25 representative of the estimated currents in each leg of the load; specifically:

the signal at terminal 23 is representative of the estimated current $I_{aE}$ in leg A;

the signal at terminal 24 is representative of the estimated current $I_{bE}$ in leg B; and the signal at terminal 25 is representative of the estimated current $I_{cE}$ in leg C.

More particularly, as will be seen in FIG. 2, the output $D_{vac}$ of differential amplifier 21 is applied after analog-to-digital conversion to terminal 26, and the output $D_{vbc}$ of differential amplifier 22 is applied after analog-to-digital conversion to terminal 27. These signals at terminals 26 and 27 are supplied to an intermediate combiner (summation device) 28 that produces an output ($D_{vbc}-D_{vac}$) and the signals at terminals 26 and 27 are also applied as shown to combiners 29 and 31. In FIG. 2, the polarity signs "+" and "−" at the input terminals of each combiner indicate whether addition or subtraction is to be performed within the combiner. The output of combiner 28 is applied as an input to combiner 30, which also accepts a second input from amplifier 45, as discussed further below. The outputs of combiners 29, 30 and 31 are each applied to integrators 32, 33 and 34 each of which processes its associated input signal value $u_A$, $u_B$, or $u_C$ (each value is generically referred to simply as "u") to produce an output signal value $$y = \frac{1}{s} u$$

where s is the Laplace operator, and y is therefore the integral of u, expressed as ∫u. Of course, the value y and the value u for any one of the integrators 32, 33, 34 will not be the same as for any of the other of these integrators, except coincidentally.

The outputs of the integrators 32, 33 and 34 are applied to amplifiers 35, 36 and 37 respectively, each of which has a gain z. Therefore, using the same notation, the output of amplifier 35 is $zy_1$, and similarly the output of amplifier 36 is $zy_2$, and the output of amplifier 37 is $zy_3$, where $Y_1$, $Y_2$, and $y_3$ are the outputs of integrators 32, 33 and 34 respectively. These outputs are applied to multipliers 38, 39 and 40 that multiply together the values of the two input signals applied to each. Also applied to these multipliers as a second input to each are signals provided at terminals 47, 48 and 49 of the form $$(M-\alpha)/M, (M-\beta)/M, \text{ and } (M-\gamma)/M$$

respectively, where M is the half-period of the pulse-width modulation carrier signal; and the values α, β and γ are derived as follows:

$$\alpha=V_L \sin(\omega t-\Phi)$$
$$\beta=V_L \sin(\omega t-\Phi-2\pi/3)$$
$$\gamma=V_L \sin(\omega t-\Phi-4\pi/3)$$

where $V_L$ is the amplitude, ω is the load voltage frequency, and Φ is the phase angle of the load voltage frequency, all of which values are set by the microcontroller.

The output $I_{aE}(M-\alpha)/M$ of multiplier 38 is applied to combiners 41 and 42. The output $I_{bE}(M-\beta)/M$ of multiplier 39 is applied to combiners 42 and 43. The output $I_{cE}(M-\gamma)/M$ of multiplier 40 is applied to combiners 43 and 41. The output of combiner 41 is applied through amplifier 44 to combiner 29. The output of combiner 42 is applied through amplifier 45 to combiner 30. The output of combiner 43 is applied through amplifier 46 to combiner 31. The gain of each of amplifiers 44, 45 and 46 is normally 1, but the gain can be adjusted to compensate for disparities between the actual leg currents and the estimated leg current values generated by the apparatus of FIG. 2. These amplifiers 44, 45 and 46 may be used to increase current output or, if serving no other useful purpose, may be omitted from the circuit, in which latter case the outputs of combiners 41, 42 and 43 would be applied as direct inputs to combiners 29, 30 and 31 respectively.

Note that for each estimated leg current value appearing at output terminals 23, 24, 25, there is an output circuit comprising a combiner followed by an integrator followed by an amplifier, each of which output circuits includes as one of its inputs a signal derived from one or both differential amplifiers, and as the other of its inputs a combined signal comprising the difference between the signal fed back from an associated multiplier and a second signal obtained from the multiplier associated with another feedback loop. For example, the output circuit for the leg A current estimate comprises combiner 29, integrator 32 and amplifier 35. A feedback loop for this output circuit comprises multiplier 38, combiner 41, and optional amplifier 44. The combiner 41 accepts as its inputs the output of associated multiplier 38 and the output of multiplier 40, and produces a difference signal that is fed back as one of the two inputs to combiner 29. In the case of this leg A processing subcircuit, the other input to combiner 29 is derived directly from the digital output obtained from the differential amplifier 21, and a similar situation exists for the leg C processing subcircuit; in this latter instance, the leg C output combiner 31 receives as one of its inputs the digital output of differential amplifier 22. However, for the leg B processing subcircuit, the signals from the two differential amplifiers are subtracted from one another in the intermediate combiner 28, whose output constitutes one of the inputs to the leg B output combiner 30. In other respects the leg current estimator subcircuits for the three legs of the load are essentially similar, although it is noted that combiner 31 provides the negative sum of its two inputs, whereas the other two output combiners 29, 30 provide output signals representing the difference between the two input signals to each. Note that each of the three feedback loops for the three leg current estimator subcircuits accepts a unique combination of inputs.

The result of the signal processing of FIG. 2 is that the signals that appear at terminals 23, 24 and 25 are representative of the estimated values of the currents in the three legs of the load; to repeat, these estimated currents are the following: $I_{aE}$ is the estimated current in leg A; $I_{bE}$ is the estimated current in leg B; and $I_{cE}$ is the estimated current in leg C. In other words, the circuit of FIG. 2 has solved the differential equations listed above. (In this specification, "solution" of a differential equation or other equation, or performance of any other computation, means solution or performance within engineering tolerances, depending upon the end use of the estimated leg current data derived). Note that the estimated current values may differ somewhat from the actual load leg current values. For steady-state current, the relationship between the estimated leg currents and the actual leg currents for the respective legs is expected to be linear, and if necessary the estimated value for each leg current may be adjusted by adjusting the gain of amplifiers 44, 45, 46 empirically. Or a correction factor could be applied by the microcontroller 17 to the output signals at terminals 23, 24, 25. Note also that if the leg current is not steady-state but subject to change, the dynamic response of the estimator circuitry of FIG. 2 in response to such change will result in instantaneous estimated leg current values that track actual leg current values, but may not faithfully reflect the higher-frequency changes in actual current value if the effective estimator circuit bandwidth is too low. The fidelity of the tracking will depend upon the choice of the value "z" in the differential equations previously set forth.

While the FETs are pulse modulated, the outputs $D_{vac}$ and $D_{vbc}$ from differential amplifiers 21 and 22 are substantially continuous signals, that is, their waveform is not a pulse form. and when applied after analog-to-digital conversion to the input terminals 26 and 27 of the estimator, these outputs are processed in accordance with the operations described above to solve the differential equations listed above, repeated here for convenience:

$$\frac{dI_{aE}}{dt} = z\left[D_{Vac} - \frac{I_{aE}}{M}(M-\alpha) + \frac{I_{cE}}{M}(M-\gamma)\right];$$

$$\frac{dI_{bE}}{dt} = z\left[D_{Vbc} - D_{Vac} + \frac{I_{aE}}{M}(M-\alpha) - \frac{I_{bE}}{M}(M-\beta)\right];$$

and where all parameters have the definitions previously given.

$$\frac{dI_{cE}}{dt} = z\left[-D_{Vbc} + \frac{I_{bE}}{M}(M-\beta) - \frac{I_{cE}}{M}(M-\gamma)\right]$$

Once the estimated load leg currents have been derived, they may be put to use in various ways. The diagram of FIG. 1 illustrates two possible uses of the estimated load leg current calculated values. In one instance, the microcontroller 17 uses the estimated load leg current values to provide drive signals 64 to a monitor 63 that displays, in any suitable and conventional fashion, the estimated load leg current values. The operator of the motor 10 or other equipment may, in response to such displayed information, take steps to modify the operation or control of the motor 10 or other three-phase AC load whose load current is being monitored.

In another possible application, the microcontroller 17 provides feedback control signals 66 representative of the estimated load currents in each of the three legs of the load to a feedback control loop or circuit 65. Many possible types of feedback control exist; for example, in the event that estimated load current in any given leg of the load were perceived to be too high (above some threshold value) a circuit breaker could open or an impedance could be added to the load to reduce the current, or some other suitable action could be taken to avoid burn-out of the motor 10 or other AC load being controlled. The control signals to be supplied by the feedback control loop 65 could therefore be applied in many different ways—in a fairly direct manner to the load itself or circuitry coupled to the load, to auxiliary or peripheral equipment associated with the load, to the drivers of the FETs or IGBTs, or the feedback control signals could be fed back to the microcontroller 17 to adjust some of the parameters governing the operation of the microcontroller 17. For example, the values $\alpha$, $\beta$ and $\gamma$ could be adjusted by the feedback control loop 65 in response to the values of the calculated estimated load leg current. Note that the feedback control loop 65, while shown as a discrete external circuit, could itself be incorporated into the microcontroller 17. Note also that the diagram of FIG. 1 does not illustrate any digital/analog conversion for converting digital values reflective of estimated load currents into analog control signals; such may be provided in conventional fashion as required.

The circuit of FIG. 1 shows two possible exemplary feedback output signal sets. A first signal set 67 comprises a feedback of suitable feedback control signals into the microcontroller 17 to control some aspect of the operation of the microcontroller 17, or some setting of input parameter values for the microcontroller 17. If the feedback is to be used to control some aspect of the operation or set values of the microcontroller 17, then it would make good design sense to incorporate the feedback control loop 65 within the microcontroller 17, in which case, the feedback control loop 65 might not be a discrete electronic device, but might simply be part of the internal circuitry of the microcontroller 17, or incorporated into the programming for the microcontroller 17.

Alternatively, the feedback control circuit 65 could provide gate drive signals 71, 72, 73, 74, 75 and 76 to FETs F1, F2, F3, F4, F5 and F6 respectively. In such a case, these drive signals would replace the drive signals 51, 52, 53, 54, 55 and 56 previously discussed. These illustrated feedback arrangements are exemplary only and not exhaustive of the possibilities.

Note that the particular use of the calculated estimated load leg current values through display in a monitor, feedback as discussed above or otherwise, etc., is not per se part of the present invention. The present invention is concerned only with the means of deriving the estimated load leg current values. The circuit designer may decide how best to use these estimated load current values for display, feedback or other purposes; such display, feedback or other purposes and the designs implementing such other purposes are not part of the present invention.

Variants of the inventive apparatus will readily occur to those skilled in the art. For example, it is within the preference of the designer to select either analog or digital devices to perform various of the requisite computation functions and operations. Further, to the extent operations are made on digital data, the operations may be programmed operations within a general-purpose or special-purpose computer or microprocessor. The invention as claimed should be understood to include such variants, as it is within the ordinary skill in the design of such apparatus to make substitutions of the foregoing type. The invention is not limited to the specific preferred embodiment illustrated and described above, but is to be accorded the full scope set forth in the appended claims.

What is claimed is:

1. A leg current estimator combination for estimating the load current in each of the legs A, B and C of a three-phase load, each leg being driven by a controlled power driver such as a pulse-width modulated field-effect transistor (FET) pair or insulated gate bipolar transistor (IGBT) pair, comprising:

a) a low-resistance leg resistor in each leg of the load and means for deriving the voltage across each said resistor;

b) a first differential amplifier receiving as its two inputs the voltage across the resistors for legs A and C of the load and producing a first analog output signal representing the difference between the two inputs thereto;

c) a second differential amplifier receiving as its two inputs the voltage across the resistors for legs B and C of the load and producing a second analog output signal representing the difference between the two inputs thereto;

d) a first analog/digital converter for converting the output of the first differential amplifier to a digital signal;

e) a second analog/digital converter for converting the output of the second differential amplifier to a digital signal;

f) a leg A output circuit comprising in series a leg A output combiner receiving as a first input the output of the first analog/digital converter, a leg A integrator for integrating the output of the leg A combiner, and a leg A output amplifier for providing an output signal representing the estimated leg A load current;

g) a leg C output circuit comprising in series a leg C output combiner receiving as a first input the output of the second analog/digital converter, a leg C integrator for integrating the output of the leg C combiner, and a leg C output amplifier for providing an output signal representing the estimated leg C load current;

h) an intermediate combiner receiving as a first input the output of the first analog/digital converter and receiving as a second input the output of the second analog/digital converter and producing an intermediate output signal representing the difference between the two input signals thereto;

i) a leg B output circuit comprising in series a leg B output combiner receiving as a first input the intermediate output signal, a leg B integrator for integrating the output of the combiner, and a leg B output amplifier for providing an output signal representing the estimated leg B load current;

j) a leg A feedback loop comprising a leg A multiplier and a leg A feedback combiner connected in series, the leg A multiplier receiving as a first input the output of the leg A output amplifier and as a second input a signal representing the value $(M-\alpha)/M$, and producing a multiplier output signal representing the product of the values of the first and second inputs to the leg A multiplier, said multiplier output signal being fed as a first input to the leg A feedback combiner;

k) a leg B feedback loop comprising a leg B multiplier and a leg B feedback combiner connected in series, the leg B multiplier receiving as a first input the output of the leg B output amplifier and as a second input a signal representing the value $(M-\beta)/M$, and producing a multiplier output signal representing the product of the values of the first and second inputs to the leg B multiplier, said multiplier output signal being fed as a first input to the leg B feedback combiner;

l) a leg C feedback loop comprising a leg C multiplier and a leg C feedback combiner connected in series, the leg C multiplier receiving as a first input the output of the leg C output amplifier and as a second input a signal representing the value $(M-\gamma)/M$, and producing a multiplier output signal representing the product of the values of the first and second inputs to the leg C multiplier, said multiplier output signal being fed as a first input to the leg C feedback combiner; the leg A feedback combiner receiving as a second input the output of the leg C multiplier, and producing an output signal representing the difference between the two inputs thereto;

the leg B feedback combiner receiving as a second input the output of the leg A multiplier, and producing an output signal representing the difference between the two inputs thereto;

the leg C feedback combiner receiving as a second input the output of the leg B multiplier, and producing an output signal representing the difference between the two inputs thereto;

the leg A output combiner receiving as a second input the output of the leg A feedback combiner with optional amplification and producing as the leg A output combiner signal the difference between the two inputs thereto;

the leg B output combiner receiving as a second input the output of the leg B feedback combiner with optional amplification and producing as the leg B output combiner signal the difference between the two inputs thereto;

the leg C output combiner receiving as a second input the output of the leg C feedback combiner with optional amplification and producing as the leg C output combiner signal the negative of the sum of the two inputs thereto;

wherein each of the leg A, leg B and leg C combiners produces a respective output signal value $u_A$, $u_B$, or $u_C$ (each value generically referred to as "u");

each of the integrators processes its associated input signal value u to produce an output signal value $$y = \frac{1}{s} u,$$

where s is the Laplace operator;

each of the leg A, leg B and leg C output amplifiers has a gain z;

M is the half-period of the pulse-width modulation carrier signal;

and the values $\alpha$, $\beta$ and $\gamma$ are derived from the equations $\alpha = V_L \sin(\omega t - \Phi)$ $\beta = V_L \sin(\omega t - \Phi - 2\pi/3)$ $\gamma = V_L \sin(\omega t - \Phi - 4\pi/3)$ where $V_L$ is the amplitude, $\omega$ is the load voltage frequency, and $\Phi$ is the phase angle of the load voltage frequency;

and whereby the estimated load currents in the respective legs A, B, C of the load are given by the solutions of the equations $$\frac{dI_{aE}}{dt} = z\left[D_{Vac} - \frac{I_{aE}}{M}(M - \alpha) + \frac{I_{cE}}{M}(M - \gamma)\right];$$

$$\frac{dI_{bE}}{dt} = z\left[D_{Vbc} - D_{Vac} + \frac{I_{aE}}{M}(M - \alpha) - \frac{I_{bE}}{M}(M - \beta)\right];$$

and $$\frac{dI_{cE}}{dt} = z\left[-D_{Vbc} + \frac{I_{bE}}{M}(M - \beta) - \frac{I_{cE}}{M}(M - \gamma)\right];$$

where $I_{aE}$ is the estimated current in leg A;

$I_{bE}$ is the estimated current in leg B;

$I_{cE}$ is the estimated current in leg C; and t is time.

2. A combination according to claim 1, wherein selected ones of elements (b) through (l) are embodied within a microprocessor operational to perform the functions of said selected elements.

3. A combination according to claim 1, wherein the optional amplification of the output of each said feedback combiner provides a voltage gain of 1.

4. A combination according to claim 1, wherein the low-resistance leg resistors are respectively located in the return legs of the load between their respective associated controlled power driver and ground, and the differential amplifiers are connected between the higher-voltage terminal of their respective associated low-resistance leg resistors and ground.

5. A combination according to claim 4, wherein selected ones of elements (b) through (l) are embodied within a microprocessor operational to perform the functions of said selected elements.

6. A combination according to claim 1, wherein the differential amplifiers each have a selected gain K and a frequency response represented by the dimensionless value 1/(TS+1), T being the inherent time constant of each of the differential amplifiers, and S being the Laplace operator, whereby the output $D_{vac}$ of the first differential amplifier is $K(V_a-V_c)/(TS+1)$ and the output $D_{vbc}$ of the second differential amplifier is $K(V_b-V_c)/(TS+1)$ where $V_a$, $V_b$ and $V_c$ are the voltages developed across the low-resistance leg resistors in legs A, B and C respectively of the load.

7. A combination according to claim 6, wherein selected ones of elements (b) through (l) are embodied within a microprocessor operational to perform the functions of said selected elements.

8. A combination according to claim 6, wherein the gain z represents the dimension-less bandwidth of the signal processing circuit and is selected so that computation performed by the signal processor occurs within the range of linear performance of the load.

9. A combination according to claim 8, wherein selected ones of elements (b) through (l) are embodied within a microprocessor operational to perform the functions of said selected elements.

10. A combination according to claim 8, wherein the leg resistors are of substantially identical resistance and the differential amplifiers are selected for substantially identical gain and internal time constant.

11. A combination according to claim 10, wherein selected ones of elements (b) through (l) are embodied within a microprocessor operational to perform the functions of said selected elements.

12. A combination according to claim 10, wherein the microcontroller provides pulse-width modulation control signals for the FETs and provides signals representing values $\alpha$, $\beta$, $\gamma$, M and z.

13. A combination according to claim 12, wherein selected ones of elements (b) through (l) are embodied within a microprocessor operational to perform the functions of said selected elements.

14. An estimator combination for estimating the load current in each of the legs A, B and C of a three-phase load, each leg being driven by a controlled power driver, comprising:

a) a low-resistance leg resistor in each leg of the load and means for deriving the voltage across each said resistor;

b) first differential means for producing a first differential digital signal representing the voltage difference between the voltages across the low-resistance leg resistors of legs A and C of the load;

c) second differential means for producing a second differential digital signal representing the voltage difference between the voltages across the low-resistance leg resistors of legs B and C of the load;

d) a leg A output circuit comprising in series a leg A output combiner receiving as a first input the first differential digital signal, a leg A integrator for integrating the output of the leg A combiner, and a leg A output amplifier for providing an output signal representing the estimated leg A load current;

e) a leg C output circuit comprising in series a leg C output combiner receiving as a first input the second differential digital signal, a leg C integrator for integrating the output of the leg C combiner, and a leg C output amplifier for providing an output signal representing the estimated leg C load current;

f) an intermediate combiner receiving as a first input the first differential digital signal and receiving as a second input the second differential digital signal and producing an intermediate output signal representing the difference between the two input signals thereto;

g) a leg B output circuit comprising in series a leg B output combiner receiving as a first input the intermediate output signal, a leg B integrator for integrating the output of the combiner, and a leg B output amplifier for providing an output signal representing the estimated leg B load current;

h) a leg A feedback loop comprising a leg A multiplier and a leg A feedback combiner connected in series, the leg A multiplier receiving as a first input the output of the leg A output amplifier and as a second input a signal representing the value (M−α)/M, and producing a multiplier output signal representing the product of the values of the first and second inputs to the leg A multiplier, said multiplier output signal being fed as a first input to the leg A feedback combiner;

i) a leg B feedback loop comprising a leg B multiplier and a leg B feedback combiner connected in series, the leg B multiplier receiving as a first input the output of the leg B output amplifier and as a second input a signal representing the value (M−β)/M, and producing a multiplier output signal representing the product of the values of the first and second inputs to the leg B multiplier, said multiplier output signal being fed as a first input to the leg B feedback combiner;

j) a leg C feedback loop comprising a leg C multiplier and a leg C feedback combiner connected in series, the leg C multiplier receiving as a first input the output of the leg C output amplifier and as a second input a signal representing the value (M−γ)/M, and producing a multiplier output signal representing the product of the values of the first and second inputs to the leg C multiplier, said multiplier output signal being fed as a first input to the leg C feedback combiner;

the leg A feedback combiner receiving as a second input the output of the leg C multiplier, and producing an output signal representing the difference between the two inputs thereto;

the leg B feedback combiner receiving as a second input the output of the leg A multiplier, and producing an output signal representing the difference between the two inputs thereto; the leg C feedback combiner receiving as a second input the output of the leg B multiplier, and producing an output signal representing the difference between the two inputs thereto;

the leg A output combiner receiving as a second input the output of the leg A feedback combiner with optional amplification and producing as the leg A output combiner signal the difference between the two inputs thereto; the leg B output combiner receiving as a second input the output of the leg B feedback combiner with optional amplification and producing as the leg B output combiner signal the difference between the two inputs thereto; the leg C output combiner receiving as a second input the output of the leg C feedback combiner with optional amplification and producing as the leg C output combiner signal the negative of the sum of the two inputs thereto;

wherein each of the leg A, leg B and leg C combiners produces a respective output signal value $u_A$, $u_B$ or $u_C$ (each value generically referred to as "u"); each of the integrators processes its associated input signal value u to produce an output signal value $$y = \frac{1}{s} u,$$

where s is the Laplace operator;

each of the leg A, leg B and leg C output amplifiers has a gain z;

M is the half-period of the pulse-width modulation carrier signal; and the values α, β and γ are derived from the equations $$\alpha = V_L \sin(\omega t - \Phi)$$

$$\beta = V_L \sin(\omega t - \Phi - 2\pi/3)$$

$$\gamma = V_L \sin(\omega t - \Phi - 4\pi 3)$$

where $V_L$ is the amplitude, ω is the load voltage frequency, and Φ is the phase angle of the load voltage frequency; and whereby the estimated load currents in the respective legs A, B, C of the load are given by the solutions of the equations $$\frac{dI_{aE}}{dt} = z\left[D_{Vac} - \frac{I_{aE}}{M}(M - \alpha) + \frac{I_{cE}}{M}(M - \gamma)\right];$$

$$\frac{dI_{bE}}{dt} = z\left[D_{Vbc} - D_{Vac} + \frac{I_{aE}}{M}(M - \alpha) - \frac{I_{bE}}{M}(M - \beta)\right];$$

and $$\frac{dI_{cE}}{dt} = z\left[-D_{Vbc} + \frac{I_{bE}}{M}(M - \beta) - \frac{I_{cE}}{M}(M - \gamma)\right];$$

where $I_{aE}$ is the estimated current in leg A;

$I_{bE}$ is the estimated current in leg B;

$I_{cE}$ is the estimated current in leg C; and t is time.

15. A combination according to claim 14, wherein selected ones of elements (b) through (j) are embodied within a microprocessor operational to perform the functions of said selected elements.

16. A three-phase DC-to-AC inverter, including three pairs of FET transistors and control means to pulse-width modulate said transistors, comprising:

(a) an estimator combination for deriving the estimated current in each of the legs A, B and C of the load, said estimator comprising:

(i) first, second and third low-resistance leg resistors in respective return legs of each pair of transistors;

(ii) first and second differential amplifiers;
(iii) means to apply the voltage appearing at the junction of the return leg of the first pair of transistors and the associated first resistor to a first terminal of said first differential amplifier;
(iv) means to apply the voltage appearing at the junction of the return leg of the third pair of transistors and the associated third resistor to a second terminal of said first differential amplifier;
(v) means to apply the voltage appearing at the junction of the return leg of the second pair of transistors and the associated second resistor to a first terminal of said second differential amplifier; and
(vi) means to apply the voltage appearing at the junction of the return leg of the third pair of transistors and the associated third resistor to a second terminal of said second differential amplifier; and (b) a signal processor to process the output signal $D_{vac}$ of the first differential amplifier and the output signal $D_{vbc}$ of the second differential amplifier; where the output signal $D_{vac}$ of the first differential amplifier is $$K(V_a-V_c)/(TS+1)$$

and the output $D_{vbc}$ of the second differential amplifier is $$K(V_b-V_c)/(TS+1),$$

where $V_a$, $V_b$ and $V_c$ are the voltages developed across the low-resistance leg resistors in the three legs respectively of the load, T is the time constant of each differential amplifier, and S is the Laplace operator, said processor processing the said signals $D_{vac}$ and $D_{vbc}$ in combination with other selected data representative of selected load parameters to produce signals representative of the estimated current in each leg of the load.

17. An inverter according to claim 16, wherein the said signal processor processes the output signals $D_{vac}$, $D_{vbc}$ of the differential amplifiers to solve the differential equations $$\frac{dI_{aE}}{dt} = z\left[D_{Vac} - \frac{I_{aE}}{M}(M-\alpha) + \frac{I_{cE}}{M}(M-\gamma)\right];$$

$$\frac{dI_{bE}}{dt} = z\left[D_{Vbc} - D_{Vac} + \frac{I_{aE}}{M}(M-\alpha) - \frac{I_{bE}}{M}(M-\beta)\right];$$

$$\frac{dI_{cE}}{dt} = z\left[-D_{Vbc} + \frac{I_{bE}}{M}(M-\beta) - \frac{I_{bE}}{M}(M-\gamma)\right];$$

and
where
$I_{aE}$ is the estimated current in leg A;
$I_{bE}$ is the estimated current in leg B;
$I_{cE}$ is the estimated current in leg C;
M is the half-period of the pulse-width modulation carrier signal; and the values $\alpha$, $\beta$ and $\gamma$ are derived from the equations $$\alpha = V_L \sin(\omega t - \Phi)$$
$$\beta = V_L \sin(\omega t - \Phi - 2\pi/3)$$
$$\gamma = V_L \sin(\omega t - \Phi - 4\pi/3)$$

where $V_L$ is the amplitude, $\omega$ is the load voltage frequency, and $\Phi$ is the phase angle of the load voltage frequency; and t is time.

18. An inventor according to claim 17, wherein the processor is a microprocessor operational to solve the said equations.

19. An estimator combination for estimating the load current in each of the legs A, B and C of a three-phase load, each leg being driven by a controlled power driver such as a pulse-width modulated field-effect transistor (FET) pair or insulated gate bipolar transistor (IGBT) pair, comprising:

a) a low-resistance leg resistor in each leg of the load and means for deriving the voltage across each said resistor;

b) a first differential amplifier receiving as its two inputs the voltage across the resistors for legs A and C of the load and producing an analog output signal representing the difference between the two inputs thereto;

c) a second differential amplifier receiving as its two inputs the voltage across the resistors for legs B and C of the load and producing an analog output signal representing the difference between the two inputs thereto;

d) a first analog/digital converter for converting the output of the first differential amplifier to a digital signal;

e) a second analog/digital converter for converting the output of the second differential amplifier to a digital signal;

f) a leg A output circuit comprising in series a leg A output combiner receiving as a first input the output of the first analog/digital converter, a leg A integrator for integrating the output of the leg A combiner, and a leg A output amplifier for providing an output signal representing the estimated leg A load current;

g) a leg C output circuit comprising in series a leg C output combiner receiving as a first input the output of the second analog/digital converter, a leg C integrator for integrating the output of the leg C combiner, and a leg C output amplifier for providing an output signal representing the estimated leg C load current;

h) an intermediate combiner receiving as a first input the output of the first analog/digital converter and receiving as a second input the output of the second analog/digital converter and producing an intermediate output signal representing the difference between the two input signals thereto;

i) a leg B output circuit comprising in series a leg B output combiner receiving as a first input the intermediate output signal, a leg B integrator for integrating the output of the combiner, and a leg B output amplifier for providing an output signal representing the estimated leg B load current;

j) a leg A feedback loop comprising a leg A multiplier and a leg A feedback combiner connected in series, the leg A multiplier receiving as a first input the output of the leg A output amplifier and as a second input a signal representing the value $(M-\alpha)/M$, and producing a multiplier output signal representing the product of the values of the first and second inputs to the leg A multiplier, said multiplier output signal being fed as a first input to the leg A feedback combiner;

k) a leg B feedback loop comprising a leg B multiplier and a leg B feedback combiner connected in series, the leg B multiplier receiving as a first input the output of the leg B output amplifier and as a second input a signal representing the value $(M-\beta)/M$, and producing a multiplier output signal representing the product of the values of the first and second inputs to the leg B multiplier, said multiplier output signal being fed as a first input to the leg B feedback combiner;

l) a leg C feedback loop comprising a leg C multiplier and a leg C feedback combiner connected in series, the leg C multiplier receiving as a first input the output of the leg C output amplifier and as a second input a signal representing the value (M−γ)/M, and producing a multiplier output signal representing the product of the values of the first and second inputs to the leg C multiplier, said multiplier output signal being fed as a first input to the leg C feedback combiner; the leg A feedback combiner receiving as a second input the output of the leg C multiplier, and producing an output signal representing the difference between the two inputs thereto;

the leg B feedback combiner receiving as a second input the output of the leg A multiplier, and producing an output signal representing the difference between the two inputs thereto; the leg C feedback combiner receiving as a second input the output of the leg B multiplier, and producing an output signal representing the difference between the two inputs thereto;

the leg A output combiner receiving as a second input the output of the leg A feedback combiner with optional amplification and producing as the leg A output combiner signal the difference between the two inputs thereto; the leg B output combiner receiving as a second input the output of the leg B feedback combiner with optional amplification and producing as the leg B output combiner signal the difference between the two inputs thereto; the leg C output combiner receiving as a second input the output of the leg C feedback combiner with optional amplification and producing as the leg C output combiner signal the negative of the sum of the two inputs thereto;

wherein each of the leg A, leg B and leg C combiners produces a respective output signal value $u_A$, $u_B$ or $u_C$ (each value generically referred to as "u");

each of the integrators processes its associated input signal value u to produce an output signal value $$y = \frac{1}{s} u,$$

where s is the Laplace operator;

each of the leg A, leg B and leg C output amplifiers has a gain z;

M is the half-period of the pulse-width modulation carrier signal; and the values α, β and γ are derived from the equations $\alpha = V_L \sin(\omega t - \Phi)$ $\beta = V_L \sin(\omega t - \Phi - 2\pi/3)$ $\gamma = V_L \sin(\omega t - \Phi - 4\pi/3)$ where $V_L$ is the amplitude, ω is the load voltage frequency, and Φ is the phase angle of the load voltage frequency;

and whereby the estimated load currents in the respective legs A, B, C of the load are given by the solutions of the equations $$\frac{dI_{aE}}{dt} = z\left[D_{Vac} - \frac{I_{aE}}{M}(M-\alpha) + \frac{I_{cE}}{M}(M-\gamma)\right];$$

$$\frac{dI_{bE}}{dt} = z\left[D_{Vbc} - D_{Vac} + \frac{I_{aE}}{M}(M-\alpha) - \frac{I_{bE}}{M}(M-\beta)\right];$$

$$\frac{dI_{cE}}{dt} = z\left[-D_{Vbc} + \frac{I_{bE}}{M}(M-\beta) - \frac{I_{bE}}{M}(M-\gamma)\right];$$

and
where
$I_{aE}$ is the estimated current in leg A;
$I_{bE}$ is the estimated current in leg B;
$I_{cE}$ is the estimated current in leg C; and
t is time; and wherein
the low-resistance leg resistors are respectively located in the return legs of the load between their respective associated controlled power driver and ground, and the differential amplifiers are connected between the higher-voltage terminal of their respective associated low-resistance leg resistors and ground;
the differential amplifiers each have a selected gain K and a frequency response represented by the dimensionless value 1/(TS+1), T being the inherent time constant of each of the differential amplifiers, and S being the Laplace operator,
whereby
the output $D_{vac}$ of the first differential amplifier is $K(V_a - V_c)/(TS+1)$ and the output $D_{vbc}$ of the second differential amplifier is $K(V_b - V_c)/(TS+1)$ where $V_a$, $V_b$ and $V_c$ are the voltages developed across the low-resistance leg resistors in legs A, B and C respectively of the load;
the gain z represents the dimensionless bandwidth of the signal processor and is selected so that computation performed by the signal processor occurs within the range of linear performance of the load;
the leg resistors are of substantially identical resistance and the differential amplifiers are selected for substantially identical gain and internal time constant.

20. An estimator according to claim 19, wherein the optional amplification of the output of each said feedback combiner provides a voltage gain of 1.

21. An estimator according to claim 20, in combination with a microcontroller for providing pulse-width modulation control signals for the controlled power driver and providing signals representative of values α, β, γ, M and z.

22. An estimator according to claim 21, wherein selected ones of elements (b) through (l) are embodied within a microprocessor operational to perform the functions of said selected elements.

23. A combination for estimating the load current in each of three legs A, B, C of a three-phase load, each said leg being driven by a controlled power driver such as a pulse-width modulated field-effect transistor (FET) pair or insulated gate bipolar transistor (IGBT) pair, in response to pulse-width modulation provided by a microcontroller connected to the controlled power drivers; wherein the microcontroller produces selected parameter signals representing the values of parameters α, β, γ, M and z of the inverter; comprising:

a) a low-resistance leg resistor in each leg of the load and means for deriving the voltage across each said resistor;

b) first differential means for producing a first differential digital signal representing the voltage difference between the voltages across the low-resistance leg resistors of legs A and C of the load;

c) second differential means for producing a second differential digital signal representing the voltage difference between the voltages across the low-resistance leg resistors of legs B and C of the load;

d) a signal processor for receiving the first and second differential digital signals and the selected parameter signals and processing said signals to derive an estimated current for each leg of the load;

where the value M is the half-period of the pulse-width modulation carrier signal; and the values $\alpha$, $\beta$ and $\gamma$ are derived from the equations $$\alpha = V_L \sin(\omega t - \Phi)$$

$$\beta = V_L \sin(\omega t - \Phi - 2\pi/3)$$

$$\gamma = V_L \sin(\omega t - \Phi - 4\pi/3)$$

where $V_L$ is the amplitude, $\omega$ is the load voltage frequency, and $\Phi$ is the phase angle of the load voltage frequency; and z represents the dimensionless bandwidth of the signal processor and is selected so that computation performed by the signal processor occurs within the range of linear performance of the load.

24. A combination according to claim 23, wherein the signal processor is embodied within a microprocessor operational to perform the functions of said signal processor.

25. A combination for estimating the load current in each of three legs A, B, C of a three-phase load, each leg being driven by a controlled power driver such as a pulse-width modulated field-effect transistor (FET) pair or insulated gate bipolar transistor (IGBT) pair in response to pulse-width modulation provided by a microcontroller connected to the controlled power drivers; wherein the microcontroller produces selected parameter signals representing the values of parameters $\alpha$, $\beta$, $\gamma$, M and z of the inverter; comprising:

a) a low-resistance leg resistor in each leg of the load and means for deriving the voltage across each said resistor; and b) a signal processor receiving (i) signals derived from the voltages across the low-resistance leg resistors and (ii) the selected parameter signals, and processing said signals to derive an estimated current for each leg of the load;

where the value M is the half-period of the pulse-width modulation carrier signal; and the values $\alpha$, $\beta$ and $\gamma$ are derived from the equations $$\alpha = V_L \sin(\omega t - \Phi)$$

$$\beta = V_L \sin(\omega t - \Phi - 2\pi/3)$$

$$\gamma = V_L \sin(\omega t - \Phi - 4\pi/3)$$

where $V_L$ is the amplitude, $\omega$ is the load voltage frequency, and $\Phi$ is the phase angle of the load voltage frequency; and z represents the dimensionless bandwidth of the signal processor and is selected so that computation performed by the signal processor occurs within the range of linear performance of the load.

26. A combination according to claim 25, wherein the signal processor solves the differential equations $$\frac{dI_{aE}}{dt} = z\left[D_{Vac} - \frac{I_{aE}}{M}(M - \alpha) + \frac{I_{cE}}{M}(M - \gamma)\right];$$

$$\frac{dI_{bE}}{dt} = z\left[D_{Vbc} - D_{Vac} + \frac{I_{aE}}{M}(M - \alpha) - \frac{I_{bE}}{M}(M - \beta)\right];$$

and $$\frac{dI_{cE}}{dt} = z\left[-D_{Vbc} + \frac{I_{bE}}{M}(M - \beta) - \frac{I_{cE}}{M}(M - \gamma)\right];$$

where $I_{aE}$ is the estimated current in leg A;

$I_{bE}$ is the estimated current in leg B;

$I_{cE}$ is the estimated current in leg C; and t is time.

27. A combination according to claim 26, wherein the signal processor is embodied within a microprocessor operational to perform the functions of said signal processor.

* * * * *